United States Patent
Jung et al.

(10) Patent No.: US 9,155,007 B2
(45) Date of Patent: Oct. 6, 2015

(54) METHOD AND APPARATUS FOR RRC CONNECTION REESTABLISHMENT IN WIRELESS COMMUNICATION SYSTEM

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 882 days.

(21) Appl. No.: 12/588,929

(22) Filed: Nov. 2, 2009

(65) Prior Publication Data

US 2010/0130205 A1    May 27, 2010

Related U.S. Application Data

(60) Provisional application No. 61/110,955, filed on Nov. 3, 2008.

(30) Foreign Application Priority Data

Oct. 13, 2009    (KR) .................. 10-2009-0097050

(51) Int. Cl.
  H04W 24/02    (2009.01)
  H04W 36/00    (2009.01)
  H04W 48/18    (2009.01)
  (Continued)

(52) U.S. Cl.
  CPC .......... *H04W 36/0066* (2013.01); *H04W 24/02* (2013.01); *H04W 48/18* (2013.01); *H04W 76/028* (2013.01); *H04W 76/046* (2013.01)

(58) Field of Classification Search
  CPC ... H04W 76/028; H04W 36/08; H04W 36/16; H04W 36/30; H04W 36/165; H04W 36/36; H04W 36/0061; H04W 36/0071; H04W 48/20
  USPC ................... 455/435.1, 435.2, 435.3
  See application file for complete search history.

(56) References Cited

U.S. PATENT DOCUMENTS

2006/0062237 A1* 3/2006 Kim .................. 370/432
2008/0261600 A1* 10/2008 Somasundaram et al. ..... 455/436

FOREIGN PATENT DOCUMENTS

CN    1615665 A    5/2005
CN    1717952 A    1/2006
(Continued)

OTHER PUBLICATIONS

3GPP TS 25.304 V8.3.0 (Technical Specification Group Radio Access Network; User Equipment (UE) procedures in idle mode and procedures for cell reselection in connected mode (Release 8); Published (Sep. 23, 2008); hereinafter 3GPP TS 25.304).*
TSG-RAN WG2 meeting#7 Agenda Item 17.6 (TSGR2#7(99)a53; Sep. 1999: Proposal of a Parameter for RRC Connection Re-establishment.*
(Continued)

*Primary Examiner* — Nalini Mummalaneni
(74) *Attorney, Agent, or Firm* — McKenna Long & Aldridge LLP

(57) ABSTRACT

A method of reestablishing a RRC connection by the mobile terminal in a RRC_CONNECTED state is disclosed, where the method includes selecting a target cell based on cell quality values measured by using signals from a candidate cell set, determining a cell type of the target cell, and transmitting a RRC connection reestablishment request message to the target cell, when the target cell is a first type cell providing with both a emergency service and a normal service.

4 Claims, 14 Drawing Sheets

(51) Int. Cl.
*H04W 76/02* (2009.01)
*H04W 76/04* (2009.01)

(56) References Cited

FOREIGN PATENT DOCUMENTS

| | | |
|---|---|---|
| CN | 101132611 A | 2/2008 |
| KR | 10-2004-0050413 | 6/2004 |
| KR | 10-2004-0058414 | 7/2004 |
| WO | WO 2004021732 A2 * | 3/2004 |
| WO | WO 2006/045334 | 5/2006 |
| WO | WO 2008157573 A1 * | 12/2008 |

OTHER PUBLICATIONS

3GPP TS 36.304 V8.3.0 3GPP Technical Specification Group Radio Access Network; Evolved Universal Terrestrial Radio Access (E-UTRA) User Equipment Procedures in Idle Mode (Release 8); Published Sep. 2008.*

3GPP TS 23.401 V8.3.0 3GPP Technical Specification Group Services and System Aspects; General Packet Radio Service (GPRS) enhancements for Evolved Universal Terrestrial Radio Access Network (E-UTRAN) access (Release 8) Published Sep. 2008.*

3GPP TS 36.331 V8.3.0 (Published Sep. 2008) 3rd Generation Partnership Project; Technical Specification Group Radio Access Network; Evolved Universal Terrestrial Radio Access (E-UTRA) Radio Resource Control (RRC); Protocol specification (Release 8).*

* cited by examiner

METHOD AND APPARATUS FOR RRC CONNECTION REESTABLISHMENT IN WIRELESS COMMUNICATION SYSTEM

This application claims the benefit of U.S. Provisional Application No. 61/110,955, filed on Nov. 3, 2008, and Korean Application No. 10-2009-97050, filed on Oct. 13, 2009, which is hereby incorporated by reference.

BACKGROUND OF THE INVENTION

1. Field of the Invention

The present invention relates to a wireless communication system, and more particularly, to a method for selecting a cell in a RRC connection reestablishment procedure.

2. Discussion of the Related Art

A basic purpose of selecting a cell is to register user equipment (UE) in a network and receive a service from a cell. If the intensity and the quality of a signal between a UE and a cell become inferior due to the mobility of the UE, the UE reselects another cell in order to maintain data transmission quality.

The above-mentioned cell selection process is divided into two categories such as following.

First one is an initial cell selection, that the UE does not have information about radio channel. Therefore, the UE may retrieve every radio channel in order to select a cell, and then may select a cell corresponding to a radio channel of which a signal quality is strongest among the retrieved radio channels.

Second one is a stored information cell selection, that the UE uses stored information. The stored information is already stored in the UE or is broadcasted by the cell. In this case, the UE can perform the cell selection process more quickly than the first case, since the UE already has the information about the radio channels or can perceive instantly the information about the radio channels through the broadcast information.

An equation 1 shows the cell selection criterion of LTE (Long Term Evolution) system described in 3GPP TS 36.304.

$$Srxlev=Qrxlevmeas-(Qrxlevmin+Qrxlevminoffset)-Pcompensation>0 \quad \text{[Equation 1]}$$

Parameters using the equation 1 are shown in table 1.

TABLE 1

| | |
|---|---|
| Qrxlevmeas | Measured cell RX level value (RSRP). |
| Qrxlevmin | Minimum required RX level in the cell (dBm) |
| Qrxlevminoffset | Offset to the signaled Qrxlevmin |
| Pcompensation | max(PEMAX − PUMAX, 0) (dB) |
| PEMAX | Maximum TX power level an UE may use when transmitting on the uplink in the cell (dBm) |
| PUMAX | Maximum RF output power of the UE (dBm) |

The UE may receive the parameters shown in table 2 through SI (System Information), and then may perform the cell selection process using the cell selection criterion shown in equation 1.

The SI includes basic information necessary for accessing a network. Accordingly, the conventional UE should receive the SI before accessing the cell and should have the newest SI. Since the SI must be known to the UE in the cell, the cell may broadcast the SI periodically.

The SI is divided into MIB (Master Information Block), SB (Scheduling Block), SIB (System Information Block), and so on. MIB informs the UE of physical information of the cell, such as bandwidth. For example, one SIB includes only a neighbor cell list (NCL), and other SIB includes only information about uplink radio channel which is used by the UE.

Further, SB informs the UE of information about transmitting SIB, such as transmitting period.

If the intensity and the quality of a signal between a UE and a cell become inferior due to the mobility of the UE, the UE reselects another cell in order to maintain data transmission quality.

On the other hand, after UE selects certain cell through cell selection process, the intensity and the quality of a signal between the UE and the cell become inferior due to the mobility of the UE. If the quality of the cell becomes inferior, the UE may select other cell which provides the UE with better quality signal. This procedure is referred to as a cell reselection process.

As a view of the quality of radio signal, a basic object of the cell reselection process is selecting a cell that provides the UE with best quality signal. Besides of the view of the quality of radio signal, a network may decide a priority of frequency, and then may inform the UE of the priority. The UE may consider the priority prior to the cell selection criterion.

Conventionally, methods for reselecting a cell differ according to parameters associated with a radio access technology (RAT) and a frequency characteristic of the cell participating in the reselection of the cell. The conventional methods are divided such as following table 2.

TABLE 2

| | |
|---|---|
| Intra-frequency cell reselection | A UE reselects a cell having the same center frequency and RAT as a serving cell |
| Inter-frequency cell reselection | A UE reselects a cell having the same RAT as a serving cell and a center frequency different from the serving cell |
| Inter-RAT cell reselection | A UE reselects a cell using a RAT different from a RAT which is being used by a serving cell |

FIG. 1 shows the conventional operation of a UE in an idle mode when the UE is powered on.

Referring to FIG. 1, when the UE is powered on, the UE automatically or manually selects a public land mobile network (PLMN) from which a service is desired to be received, and a RAT for communication (S110). The PLMN and RAT information may be selected by the user of the UE or by the PLMN. Alternatively, the PLMN and the RAT information stored in a universal subscriber identity module (USIM) may be used.

In this case, UE may measure a radio signal received from a cell (S130), which is a reference signal or a pilot signal, and calculate a cell quality value using the characteristic of a physical signal associated with the intensity of a signal or a signal-to-noise interference ratio.

Thereafter, the UE performs a cell selection process of selecting a cell having a highest cell quality value among cells of which the cell quality value is larger than a reference value (S120). The reference value indicates a value which is defined in a system in order to ensure the quality of a physical signal in transmission and reception of data. Accordingly, the reference value may be changed according to the applied RATs, and may be applied by the equation 1 in LTE system Thereafter, the UE receives system information (SI) that is periodically transmitted by the base station. The UE registers its information (e.g., international mobile subscriber identity (IMSI)) in a network in order to receive a service (e.g., paging) from the network (S150). The UE does not register its information whenever the cell is selected. Instead, the UE registers its information in the network only if needed. For example, the UE registers its information in the network if network information (e.g., tracking area identity (TAI))

received from the SI is different from the network information about which the UE knows (S140 and S170).

If the cell quality value of the serving cell is lower than that of a neighbor cell, the UE reselects one of other cells providing with better signal characteristics than the cell of the base station which the UE accesses. In order to distinguish this procedure from the cell selection process of the step S120, this procedure (S160) is called a cell reselection process. In the cell reselection process, a time limit condition (ex. Cell select timer) is configured in order to prevent the UE reselecting a cell frequently according to a signal characteristic.

On the other hand, if the conventional cell selection process is directly applied to the RRC connection reestablishment procedure, the UE always transmits a RRC connection reestablishment request message to the selected cell regardless of a type of the selected cell. That is, though the selected cell can not provide the UE with normal services, the UE transmits the RRC connection reestablishment request message to the selected cell. As consequently, the cell may transmit a RRC connection reestablishment reject message to the UE. In this case, it is a problem that the UE has to perform all procedures for being provided with the services by the cell, in order to maintain the services.

Further, in the conventional cell selection process, the UE considers cells that use all RAT (Radio Access Technology) supported by the UE. Therefore, if the conventional cell selection process is directly applied to the RRC connection reestablishment procedure, the UE can select the cell using not E-UTRA but other RAT. However, since the cell using other RAT does not have a context and a configuration of the UE, the UE recognizes the RRC connection reestablishment procedure as a failure. Then, it is a problem that the UE may leave from the RRC_CONNECTED state to the RRC_IDLE state though there is sufficient time for retrieving the cell using E-UTRA.

Further, if the conventional cell selection process is directly applied to the RRC connection reestablishment procedure, the continuity of the RRC connection can not be ensured.

SUMMARY OF THE INVENTION

Accordingly, the present invention is directed to a method and apparatus for RRC connection reestablishment in wireless communication system that substantially obviates one or more problems due to limitations and disadvantages of the related art.

An object of the present invention is to provide a method for reestablishing RRC connection and selecting a cell capable of improving success probability of RRC connection reestablishment procedure.

Another object of the present invention is to provide a method for reestablishing RRC connection and selecting a cell capable of decreasing suspension time caused in RRC connection reestablishment procedure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reestablishing a RRC (Radio Resource Control) connection by a Multi RAT (Radio Access Technology) mobile terminal in a RRC_CONNECTED state with a cell using a specific RAT includes establishing a candidate cell set by precluding one or more cells using a RAT other than the specific RAT from the candidate cell set; selecting a target cell among the candidate cell set, based on cell quality values corresponding to each cell included in the candidate cell set; and transmitting a RRC connection reestablishment request message to the target cell.

Preferably, establishing the candidate cell set comprises: turning off one or more receivers for the RAT other than the specific RAT.

The method may further comprises starting a cell selection timer before performing establishing the candidate cell set; and leaving from the RRC_CONNECTED state to a RRC_IDLE state, when the target cell is not selected until the cell selection timer is expired.

The method may further comprises receiving a RRC connection reestablishment message from the target cell after transmitting the RRC connection reestablishment request message; and transmitting a RRC connection reestablishment complete message to the target cell.

In other aspect of the present invention, a method of reestablishing a RRC (Radio Resource Control) connection by a Multi RAT (Radio Access Technology) mobile terminal in a RRC_CONNECTED state with a cell using a specific RAT includes measuring cell quality values by using signals from a candidate cell set; establishing a candidate cell quality values by precluding the cell quality values of one or more cells using RAT other than the specific RAT from the measured cell quality values; selecting a target cell based on the candidate cell quality values; and transmitting a RRC connection reestablishment request message to the target cell.

The method further starting a cell selection timer before performing measuring cell quality values; and leaving from the RRC_CONNECTED state to a RRC_IDLE state, when the target cell is not selected until the cell selection timer is expired.

The method further includes receiving a RRC connection reestablishment message from the target cell after transmitting the RRC connection reestablishment request message; and transmitting a RRC connection reestablishment complete message to the target cell.

In another aspect of the present invention, provided herein is a method of reestablishing a RRC connection by the mobile terminal in a RRC_CONNECTED state, the method comprising: selecting a target cell based on cell quality values measured by using signals from a candidate cell set; determining a cell type of the target cell; and transmitting a RRC connection reestablishment request message to the target cell, when the target cell is a first type cell providing with both a emergency service and a normal service.

The method further includes performing again selecting a target cell, when the target cell is a second type cell providing with only the emergency service.

Preferably, the method further includes leaving from the RRC_CONNECTED state, when the target cell is not the first type cell.

The method further includes starting a cell selection timer before performing selecting the target cell; and leaving from the RRC_CONNECTED state to a RRC_IDLE state, when the target cell is not selected until the cell selection timer is expired.

The method further includes receiving a RRC connection reestablishment message from the target cell after transmitting the RRC connection reestablishment request message; and transmitting a RRC connection reestablishment complete message to the target cell.

Further, the object of the present invention can be achieved by providing a Multi RAT (Radio Access Technology) mobile terminal in a RRC_CONNECTED state with a cell using a specific RAT, the Multi RAT mobile terminal comprising a receiving module for receiving signals to calculate cell quality values from a candidate cell set; a processor for calculating cell quality values by using the received signals, establishing a candidate cell quality values by precluding the cell quality values of one or more cells using RAT other than the specific RAT from the measured cell quality values, and selecting a target cell among the candidate cell set based on the candidate cell quality values; and a transmitting module for transmitting a RRC connection reestablishment request message to the target cell.

In other aspect of the present invention, provided herein is a mobile terminal comprised a receiving module for receiving signals for calculating cell quality values from a candidate cell set; a processor for calculating cell quality values by using the received signals and selecting a target cell among the candidate cell set based on the cell quality values; and a transmitting module for transmitting a RRC (Radio Resource Control connection reestablishment request message to the target cell. Further, the processor controls the transmitting module to transmit the RRC connection reestablishment request message when the target cell is a first type cell providing with both a emergency service and a normal service.

Preferably, the processor selects the target cell again when the target cell is a second type cell providing with only the emergency service.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 1 shows the conventional operation of a UE in an idle mode when the UE is powered on.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The configuration, operation and other features of the present invention will be understood by the preferred embodiments of the present invention described with reference to the accompanying drawings. The following embodiments are examples of applying the technical features of the present invention to a $3^{rd}$ Generation Partnership Project (3GPP). However, these embodiments are only exemplary and the present invention may be used in any communication system for transmitting a Single Carrier-Frequency Division Multiplexing Access (SC-FDMA) signal using multiple antennas without limit.

Figure 1:
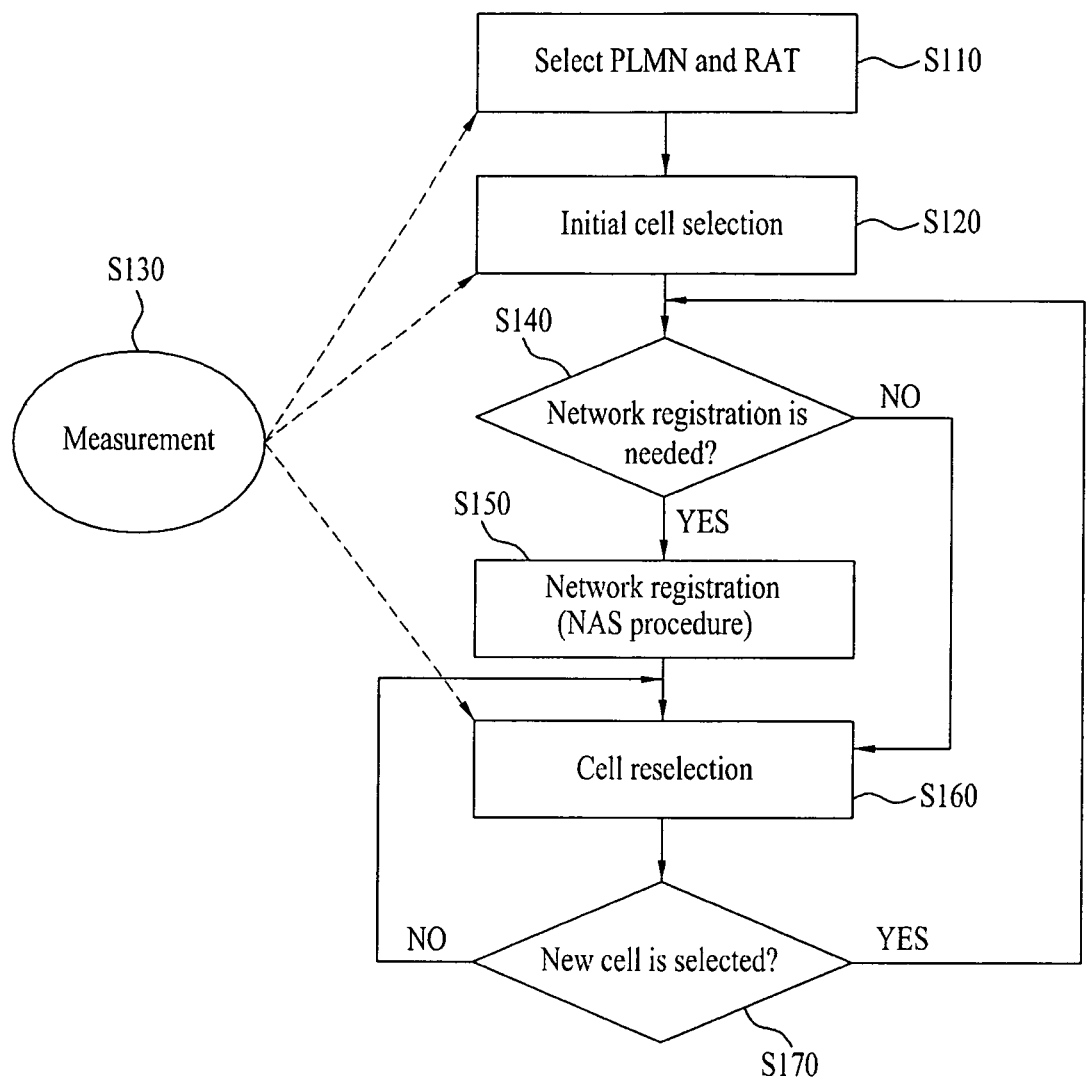
Figure 2:
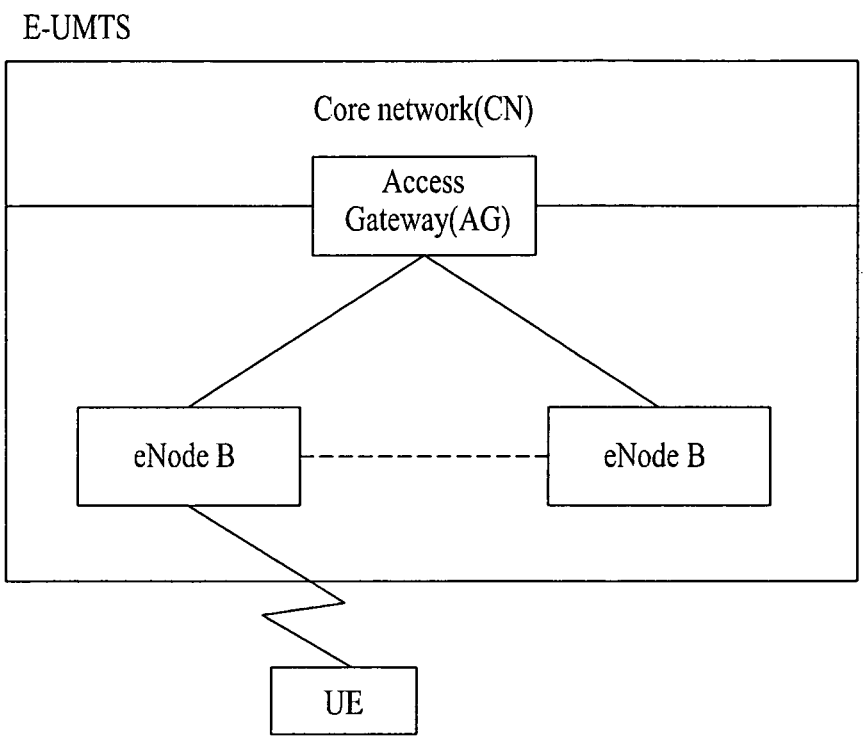
FIG. 2 shows a network structure of the E-UMTS to which an embodiment of the present invention is applied.

FIG. 2 shows a network structure of the E-UMTS to which an embodiment of the present invention is applied. The E-UMTS system is an evolved version of the conventional WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network", the entire contents of which are incorporated by reference.

As shown in FIG. 2, the E-UMTS mainly includes a User Equipment (UE), a base station (or eNB or eNode B), and an Access Gateway (AG) which is located at an end of a network (E-UTRAN) and which is connected to an external network. Generally, an eNB can simultaneously transmit multiple data streams for a broadcast service, a multicast service and/or a unicast service.

The AG can be divided into a part that processes user traffic and a part that handles control traffic. The AG part for processing new user traffic and the AG part for processing control traffic can communicate with each other using an interface. The AG manages mobility of a UE on a Tracking Area (TA) basis. One TA includes a plurality of cells. When the UE has moved from a specific TA to another TA, the UE notifies the AG that the TA where the UE is located has been changed.

A Core Network (CN) may include the AG and a network node or the like for user registration of the UE. An interface for discriminating between the E-UTRAN and the CN can be used.

Figure 3:
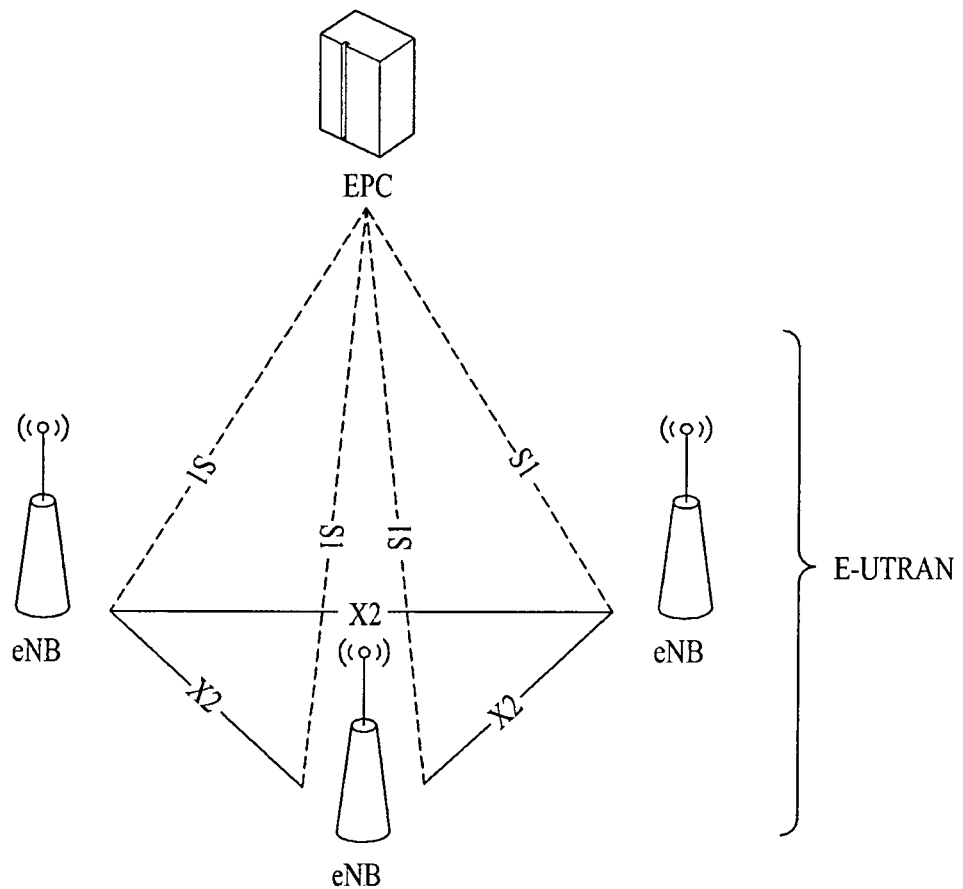
FIG. 3 illustrates a network structure of an Evolved Universal Terrestrial Radio Access Network (E-UTRAN) system which is a mobile communication system to which the embodiment of the present invention is applied.

FIG. 3 illustrates a network structure of an Evolved Universal Terrestrial Radio Access Network (E-UTRAN) system which is a mobile communication system to which the embodiment of the present invention is applied. The E-UTRAN system is an evolved version of the conventional UTRAN system. The E-UTRAN includes a base station that will also be referred to as "eNode B" or "eNB". The eNBs are connected through an X2 interface. Each eNB is connected to the User Equipment (UE) through a radio interface and is connected to an Evolved Packet Core (EPC) through an S1 interface.

EPC includes MME (Mobility Management Entity), S-GW (Serving-Gateway) and PDN-GW (Packet Data Network-Gateway). MME has information about UE connection or UE capability, which is used in managing a mobility of UE. S-GW is a gateway that has E-UTRAN as end point, and PDN-GW is a gateway that has PDN (Packet Data Network) as end point.

On the other hand, in 3GPP TS 36.304, services that E-UTRAN provides the UE are divided into three categories such as following table 3.

TABLE 3

| | |
|---|---|
| Limited service | Emergency call and ETWS (Earthquake and Tsunami Warning System) are provided. |
| Normal service | Normal services for public use are provided. |
| Operator service | Services for operators only are provided. |

Further, in 3GPP TS 36.304, a cell type is defined according to the services that E-UTRAN provides the UE, such as following table 4.

TABLE 4

| | |
|---|---|
| Acceptable cell | A cell provides the UE with the limited service only. |
| Suitable cell | A cell provides the UE with the normal service. |
| Barred cell | A cell is barred if it is so indicated in the system information. |
| Reserved cell | A cell is reserved if it is so indicated in system information. |

In table 4, the acceptable cell is a cell which is not barred and fulfills the cell selection criterion, which provides the UE with Limited service such as emergency call and ETWS.

Further, the suitable cell is a cell which fulfills conditions of the acceptable cell and additional conditions. The additional conditions are that the cell is belonging to PLMN which the UE can connect, and that is not forbidden performing TA update procedure. If the cell is CSG cell, the UE can connect the cell as a CSG member.

Figure 4A:
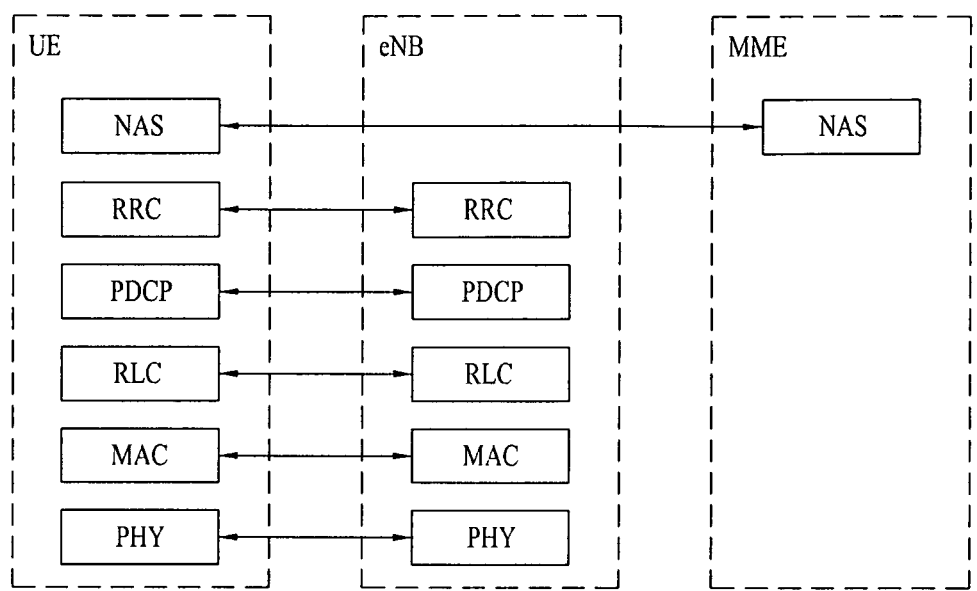
FIGS. 4A and 4B illustrate the configurations of a control plane and a user plane of a radio interface protocol between a UE and a UMTS Terrestrial Radio Access Network (UT-RAN) based on the 3GPP radio access network standard.
Figure 4B:
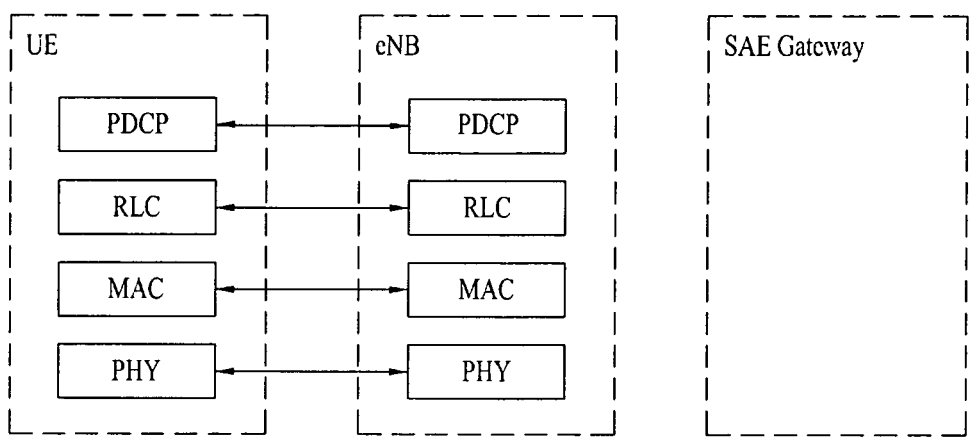

FIGS. 4A and 4B illustrate the configurations of a control plane and a user plane of a radio interface protocol between a UE and a UMTS Terrestrial Radio Access Network (UTRAN) based on the 3GPP radio access network standard. The radio interface protocol is divided horizontally into a physical layer, a data link layer and a network layer, and vertically into a user plane for data transmission and a control plane for signaling.

The protocol layers of FIGS. 4A and 4B can be divided into a L1 layer (first layer), a L2 layer (second layer) and a L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports data transmission with reliability. The functions of the RLC layer may also be implemented through internal functional blocks of the MAC layer. In this case, the RLC layer need not exist. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The RB is a service that the second layer provides for data communication between the UE and the UTRAN. To accomplish this, the RRC layer of the UE and the RRC layer of the network exchange RRC messages.

Hereafter, RRC state and RRC connection method of UE are described. RRC state indicates whether a RRC layer of UE is logically connected with a RRC layer of E-UTRAN. If the RRC layer of UE is connected with the RRC layer of E-UTRAN, the UE is in RRC_CONNECTED state. Otherwise, the UE is in RRC_IDLE state.

E-UTRAN can check an existence of the UE in RRC_CONNECTED state by cell unit, and then control the UE efficiently. The other side, E-UTRAN can not check an existence of the UE in RRC_IDLE state by not cell unit, and the CN control the UE by TA unit. That is, in order to be provided with services such as voice or data from the cell, the UE has to change from RRC_IDLE state to RRC_CONNECTED state.

Especially, when a user turns on a power of the UE, the UE may retrieve an appropriate cell, and then camp on the cell in RRC_IDLE state. The UE in RRC_IDLE state may not perform the RRC connection reestablishment procedure with the RRC of the E-UTRAN and may not change to RRC_CONNECTED state until it is necessary for the UE to have the RRC connection. Here, cases that it is necessary for the UE to have the RRC connection are transmitting uplink data caused by a call attempted by the user, transmitting response message when receiving a paging message from the E-UTRAN, and so on.

Like this, since the cell selection process is performed when the UE does not yet decides a cell on which the UE camps on in RRC_IDLE state, it is important to select the cell as soon as possible. Therefore, though a cell does not provide the UE with the best quality signal, that the cell is not the suitable cell but the acceptable cell, the cell may be selected through the cell selection process.

In other hand, when the UE does not normally communicate with the cell for a deterioration of the radio channel or configuration discordance between the UE and network, the UE may decide to be failure in current communication link. Then, the UE may begin RRC connection reestablishment procedure.

Especially, in 3GPP TS 36.331, cases that the UE does not normally communicate with the cell illustrate; a) the UE decides that there is a serious problem in a quality of a downlink communication link based on a result of a radio quality measurement in PHY layer, or in a quality of a uplink communication link since a random access procedure repeatedly fails in MAC sub-layer or an uplink data transmission repeatedly fails in RLC sub-layer, b) the UE decides that a handover procedure fails, or c) a message received by the UE does not pass integrity check, and so on.

In FIG. 4a, a Non-Access Stratum (NAS) layer located above the RRC layer performs functions such as session management and mobility management. In NAS layer, two states, which are EMM (EPS Mobility Management)-REGISTERED state and EMM-UNREGISTERED state, are defined in order to manage the mobility of the UE. The two states are applied to the UE and the MME. Initially, the UE is in EMM-UNREGISTERED state, and then the UE performs to register on the network through initial attach procedure, in order to connect with the network. When initial attach procedure has performed successfully, the UE and the MME is in EMM-REGISTERED state.

Further, in NAS layer, ECM (EPS Connection Management)-REGISTERED state and ECM-UNREGISTERED state, are defined in order to manage a signaling connection between the UE and the EPC, and the two states are applied to the UE and the MME. The UE in the ECM-UNREGISTERED state changes to the ECM-REGISTERED state when the UE has RRC connection with E-UTRAN. The MME in the ECM-UNREGISTERED state changes to the ECM-REGISTERED state when the MME has S1 connection with E-UTRAN.

When the UE is in ECM-UNREGISTERED state, E-UTRAN does not have a context of the UE. Therefore, the UE in the ECM-UNREGISTERED state performs procedures associated with the mobility based on the UE, such as the cell selection process or the cell reselection process, regardless of receiving a command from the network. On the contrary, when the UE is in ECM-REGISTERED state, the mobility of the UE is managed by the command of the network. When a position of the UE becomes to be different from a position known to the network, the UE informs the position of the UE to the network through TA update procedure.

Figure 5:
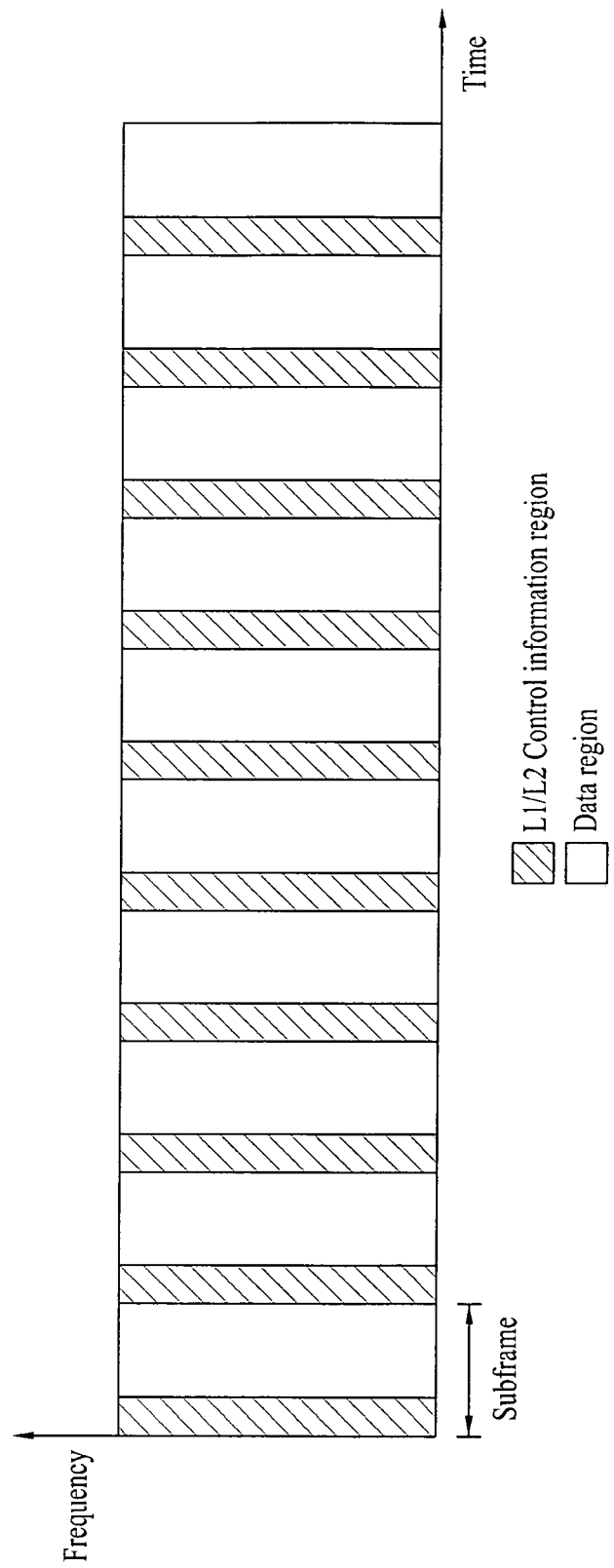
FIG. 5 is a view showing an example of a physical channel structure used in an E-UMTS system a physical channel includes several subframes on a time axis and several subcarriers on a frequency axis.

FIG. 5 is a view showing an example of a physical channel structure used in an E-UMTS system a physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In LTE system, a radio frame of 10 ms is used and one radio frame includes 10 subframes. In addition, one subframe includes two consecutive slots. The length of one slot may be 0.5 ms. A transmission time interval (TTI) which is a unit time for transmitting data is 1 ms.

As shown in FIG. 5, each subframe may use certain subcarriers of certain symbols (e.g., a first symbol) of a subframe for a physical downlink control channel (PDCCH), that is, an L1/L2 control channel. In FIG. 5, an L1/L2 control information transmission area (PDCCH, 501) and a data area (PDSCH, 502) are shown.

A base station and a UE mostly transmit/receive data via a PDSCH (502), which is a physical channel, using a DL-SCH which is a transmission channel, except a certain control signal or certain service data. Information indicating to which UE (one or a plurality of UEs) PDSCH (502) data is transmitted and how the UE receive and decode PDSCH data is transmitted in a state of being included in the PDCCH (501).

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH (501) using its RNTI information. And, a specific UE with RNTI "A" reads the PDCCH (501) and then receive the PDSCH (502) indicated by B and C in the PDCCH (501) information.

Figure 6:
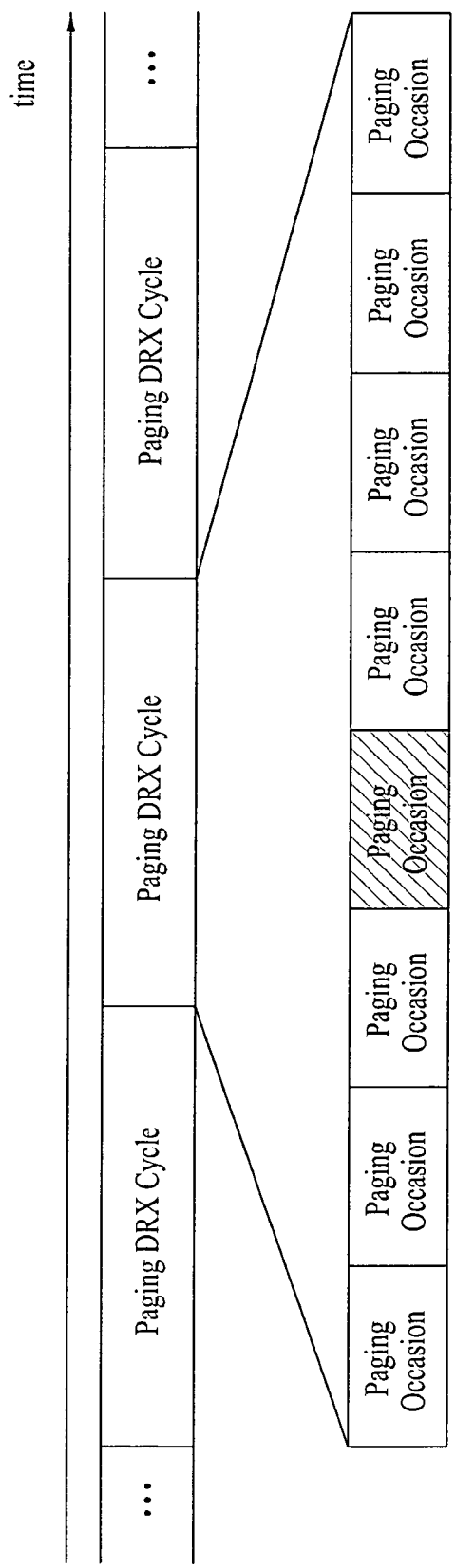
FIG. 6 is a view showing an example of a method of transmitting/receiving a paging message.

FIG. 6 is a view showing an example of a method of transmitting/receiving a paging message.

As shown in FIG. 6, the paging message includes a paging record including a paging cause and a UE identity. When receiving the paging message, the UE may perform discontinuous reception (DRX) for the purpose of reducing power consumption.

In more detail, a network configures several paging occasions in every cycle called a paging DRX cycle and a certain UE receives only a certain paging occasion and acquires a paging message. In an occasion except a certain paging occasion, the UE does not receive a paging channel and may change to a sleep mode in order to reduce power consumption. One paging occasion corresponds to one TTI.

The base station and the UE use a paging indicator (PI) as a certain value for notifying that the paging message is transmitted. The base station may define a certain identity (e.g., paging-radio network temporary identity (P-RNTI)) as the PI and notify the UE that the paging information is transmitted. For example, the UE awakes in every DRX cycle and receives one subframe in order to know whether or not the paging message is present. If the P-RNTI is included in the L1/L2 control channel (PDCCH) of the received subframe, the UE can know that the paging message is included in the PDSCH of the subframe. In addition, if the identity (e.g., the IMSI) of the UE is present in the paging message, the UE responds (e.g., RRC connection) to the base station and receives the service.

Figure 7:
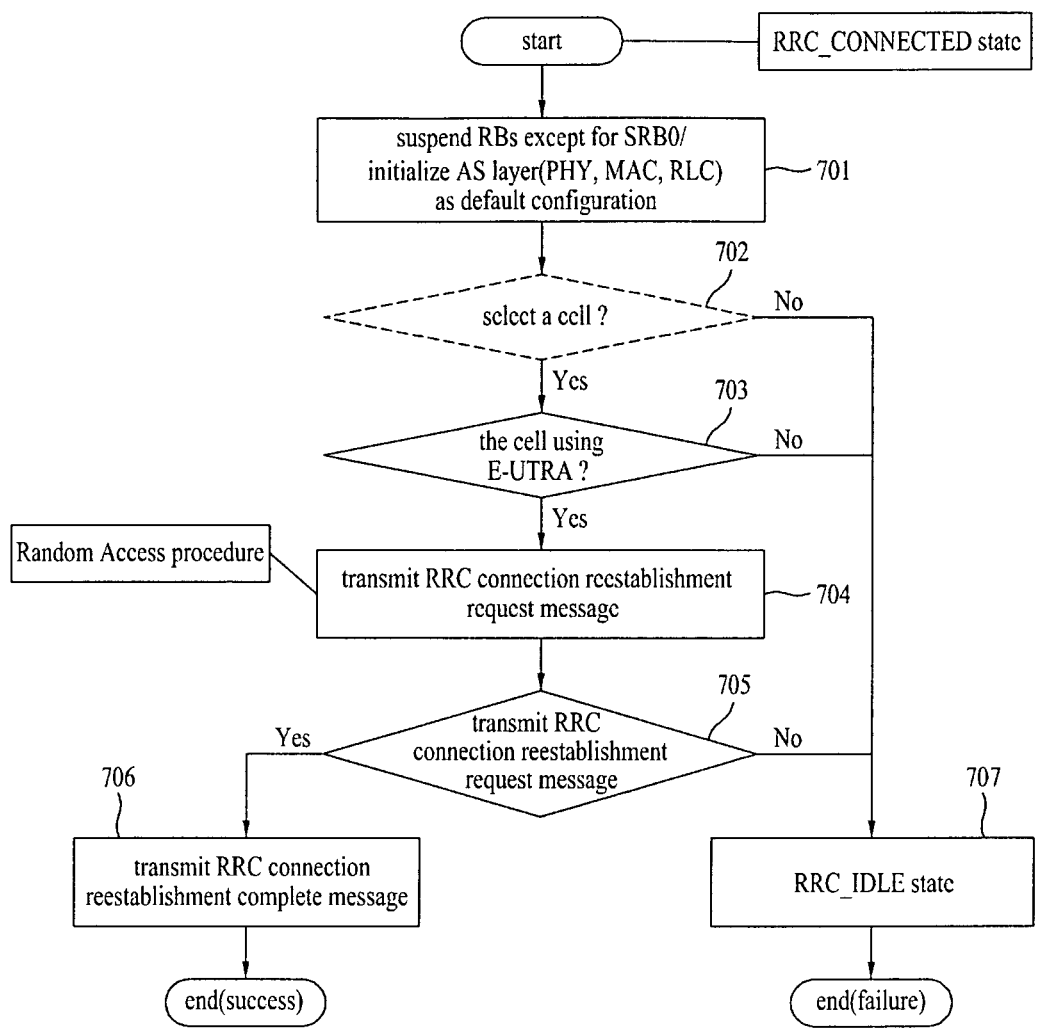
FIG. 7 illustrates a conventional RRC connection reestablishment procedure.

In following description, the RRC connection reestablishment procedure is explained concretely. FIG. 7 illustrates a conventional RRC connection reestablishment procedure.

As shown in FIG. 7, the UE may suspend every radio bearer except for SRB 0 (Signaling Radio Bearer #0), and may initialize several sub-layers of AS (Access Stratum). Then, the UE may set each sub-layer and PHY layer as default configuration. In this point, it is important that the UE maintains the RRC_CONNECTED state. (S701)

Further, the UE may perform the cell selection process for RRC connection reestablishment procedure. (S702) The conventional cell selection process for RRC connection reestablishment procedure is equal with the cell selection process performed by the UE in RRC_IDLE state.

If the UE determines a cell selected through the cell selection process for the RRC connection reestablishment procedure as a cell using the E-UTRA (S703), the UE may transmit the RRC connection reestablishment request message to the selected cell. (S704)

On the other hand, if the UE determines a cell selected as a cell using the RAT other than the E-UTRA (S703), the UE may suspend the RRC connection reestablishment procedure, and then leave from the RRC_CONNECTED state to the RRC_IDLE state. (S707) Further, if the UE does not select a cell until the cell selection timer is expired, the UE may determine the RRC connection reestablishment procedure as a failure, and then leave from the RRC_CONNECTED state to the RRC_IDLE state.

Figure 8:
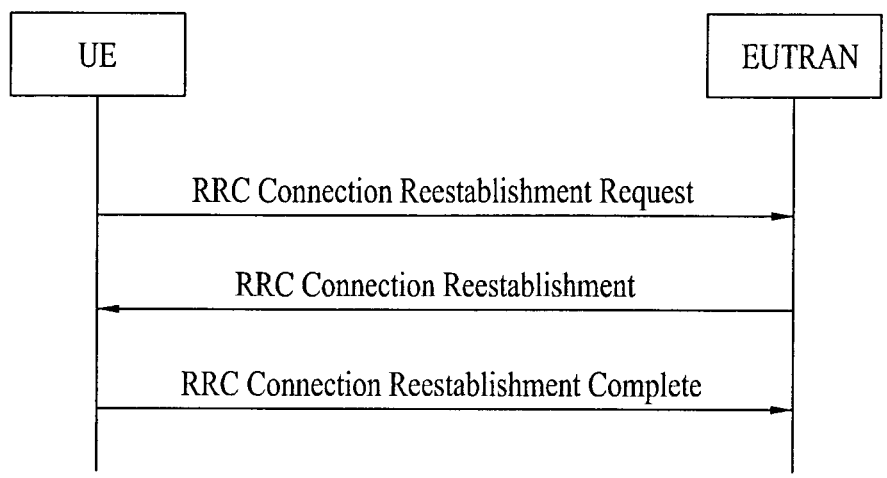
FIG. 8 illustrates the case that the RRC connection reestablishment procedure is completed successfully.

If the cell accept the RRC connection reestablishment request, the cell transmits a RRC connection reestablishment accept message to the UE. (S705) The UE received the RRC connection reestablishment accept message may reestablish a PDCP sub-layer and a RLC sub-layer about SRB 1. Then, the UE may recalculate several key values, and may reconfigure the key values into the PDCP sub-layer about a security. Thus, SRB 1 between the UE and the cell may develop, and then the UE can communicate RRC control messages. Then the UE may complete redevelopment of the SRB 1, and transmit a RRC connection reestablishment complete message. FIG. 8 illustrates the case that the RRC connection reestablishment procedure is completed successfully, such as S704, S705 and S706.

Therefore, after the RRC connection reestablishment procedure is completed successfully, the UE may perform a RRC connection reconfiguration procedure. Then, the UE can recover a condition which was set before performing the RRC connection reestablishment procedure, and the continuity of the service is ensured.

Figure 9:
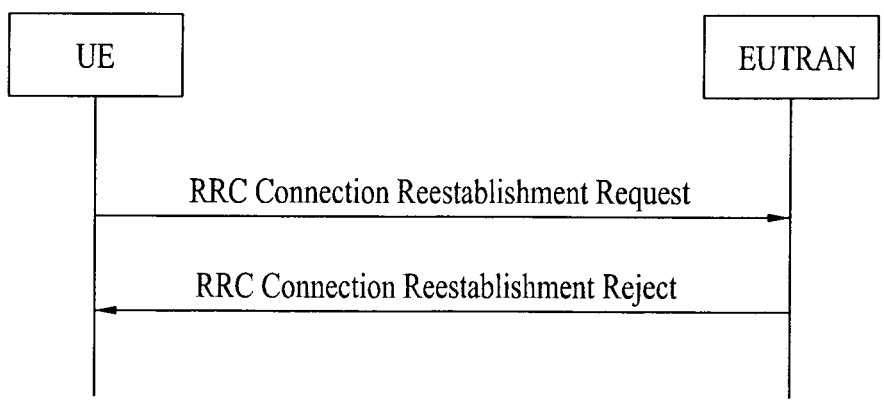
FIG. 9 illustrates the case that the RRC connection reestablishment procedure fails.

On the other hand, if the cell rejects the RRC connection reestablishment request, the cell transmits a RRC connection reestablishment reject message to the UE. The UE received the RRC connection reestablishment reject message may release the RRC_CONNECTED state and be switched to the RRC_IDLE state. FIG. 9 illustrates the case that the RRC connection reestablishment procedure fails.

After the UE leaves from the RRC_CONNECTED state to the RRC_IDLE state, the RRC of the UE may release all using radio resources, which is all RLC entities, MAC configuration, and PDCP entities, and informs a disconnection of the RRC connection for the NAS of the UE. Further, the AS of the UE may perform the initial cell selection process for the UE in the RRC_IDLE state.

Figure 10:
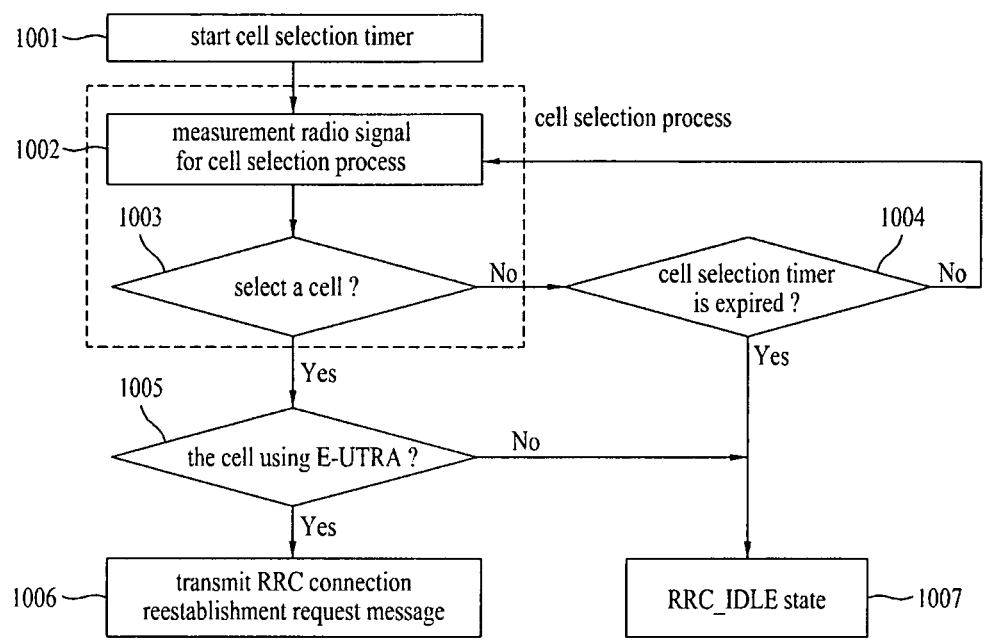
FIG. 10 illustrates parts of the RRC connection reestablishment procedure.

In following descriptions, the weak points of the conventional RRC connection reestablishment procedure are disclosed, referring to FIG. 10 shown parts of the RRC connection reestablishment procedure.

When the RRC connection reestablishment procedure starts, an operation of the cell selection timer may begin firstly. (S1001) In this case, the UE maintains the RRC_CONNECTED state. Further, the UE may receive and measure radio signals received from candidate cells, and calculate the cell quality values for the cell selection process (S1002). Then the UE may select a target cell of the RRC connection reestablishment among the candidate cells, based on the cell quality values. The candidate cells include cells using every RAT supported by the UE, as well as the cell using the E-UTRA.

Further, the cell selection process of S1002 and S1003 may have maximum allowable time for selecting the cell during the RRC connection reestablishment procedure. That is, if the UE is not capable of selecting the cell until the cell selection timer is expired (S1004), the UE may release the RRC connection and being leaved from the RRC_CONNECTED state to the RRC_IDLE state. (S1007)

If the UE may select the cell using the E-UTRA in S1003, the UE transmits the RRC connection reestablishment request message to the selected cell. Further, if the UE may select the cell using the RAT other than the E-UTRA in S1003, the UE determines that the RRC connection reestablishment procedure fails. And then, the UE releases the RRC connection and is leaved from the RRC_CONNECTED state to the RRC_IDLE state. (S1007)

As above-mentioned descriptions, the UE can select the cell using the RAT other than the E-UTRA, which is referred to as inter-RAT cell selection. In order to performing completely the RRC connection reestablishment procedure, the selected cell must have the context of the UE. However, the cell using the RAT other than the E-UTRA does not have the context, and then can not support the RRC connection reestablishment procedure. Therefore, the UE which selects the cell using the RAT other than the E-UTRA should release the RRC connection and be leaved from the RRC_CONNECTED state to the RRC_IDLE state such as S1007. Further, the UE leaved from the RRC_CONNECTED state to the RRC_IDLE state should perform every procedure for being provided with services. That is, though the UE has chances for selecting the cell using the E-UTRA until the cell selection timer, it is inefficient for the UE to release the RRC connection and perform every procedure for the RRC connection, from a view point of the service suspension.

Therefore, in the cell selection process for the RRC connection reestablishment procedure of the present invention, the cells using the RAT other than the E-UTRA are precluded from the candidate cells, and the cell using the E-UTRA can be selected whenever possible.

In order to implementing the above mentioned feature of the present invention, the UE may check whether the cell selection timer is operating or not, such that the UE can recognize that the current cell selection process is included in the RRC connection reestablishment procedure. Further, in order to preclude the cells using the RAT other than the E-UTRA from the candidate cells, if the current cell selection process is included in the RRC connection reestablishment procedure, receivers for the RAT other than the E-UTRA may be turned off. Alternatively, through disregarding the cell quality values corresponding to the cells using other RAT or setting those cell quality values as considerable low values forcibly, it is possible for the UE to let the cell using other RAT being configured not to fulfill cell selection criterion.

If the UE selects the cell using the E-UTRA in the cell selection process, a success of the RRC connection reestablishment procedure depends on types of the selected cell. That is, the cell using the E-UTRA may be one of a suitable cell providing the UE with normal service defined in 3GPP TS 36.304 or an acceptable cell not satisfied with all conditions of the suitable cell. In prior arts, the UE always transmits the RRC connection reestablishment request message to the selected cell using the E-UTRA, regardless of the cell types.

However, since the acceptable cell does not have configuration information and context of the UE performing the RRC connection reestablishment procedure, likewise the cells using the RAT other than the E-UTRA, the acceptable cell can not supported the RRC connection reestablishment procedure. Therefore, the acceptable cell may transmit the RRC connection reestablishment reject message to the UE, responding to the RRC connection reestablishment request message. Consequently, the UE yet has chances for selecting the suitable cell until the cell selection timer.

Therefore, such as the prior arts, transmitting immediately the RRC connection reestablishment request message to the acceptable cell only causes failure of the RRC connection reestablishment procedure. Further, it is inefficient for the UE to release the RRC connection and perform every procedure for the RRC connection, from a view point of the service suspension.

Therefore, in present invention, only if the selected cell using the E-UTRA is the suitable cell, the UE may transmit the RRC connection reestablishment request message to the selected cell. If the selected cell using the E-UTRA is not the suitable cell but the acceptable cell, the UE may perform the cell selection process again, instead of transmitting the RRC connection reestablishment request message.

In order to resolve the above-mentioned weak points, following description discloses the method for precluding the cells using the RAT other than the E-UTRA from the candidate cells and the method for transmitting the RRC connection reestablishment request message only if the selected cell is the suitable cell. Further, an enhanced RRC connection reestablishment procedure which is combination of the above-mentioned methods is disclosed.

<The Method for Precluding the Cells Using the Rat Other than the E-UTRA from the Candidate Cells>

Figure 11:
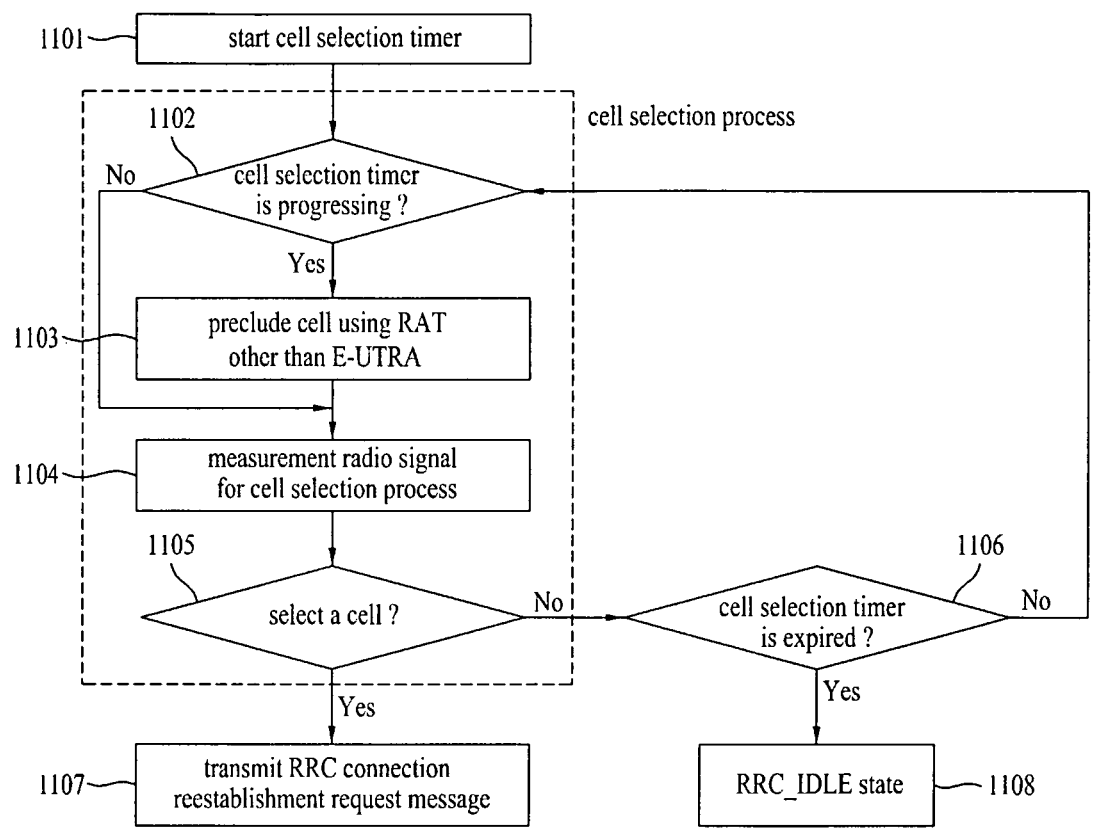
FIG. 11 is shown the cell selection process of the RRC connection reestablishment procedure according to one embodiment of the present invention.

FIG. 11 is shown the cell selection process of the RRC connection reestablishment procedure according to one embodiment of the present invention. Especially, in FIG. 11, it is disclosed the cell selection process using the method for turning off the power of the receivers for the RAT other than the E-UTRA, in order to preclude the cells using the RAT other than the E-UTRA from the candidate cells.

As shown in FIG. 11, when the RRC connection reestablishment procedure starts, an operation of the cell selection timer may begin firstly. (S1101) In this case, the UE maintains the RRC_CONNECTED state.

When the UE starts the cell selection process, the UE may check whether the current cell selection process is included in the RRC connection reestablishment procedure or not. That is, the UE may check whether the cell selection timer is operating or not (S1102).

If the current cell selection process is not included in the RRC connection reestablishment procedure (that is, the cell selection timer is not operating), the UE may consider the cell using every RAT which can be supported by the UE as the candidate cell for the cell selection process. (S1104)

On the other hand, if the current cell selection process is included in the RRC connection reestablishment procedure (that is, the cell selection timer is operating), the UE may preclude the cells using the RAT other than the E-UTRA from the candidate cells. (S1103) That is, the UE may turn off the receiver for the RAT other than the E-UTRA, such that add a condition that the UE does not consider the cell using the RAT other than the E-UTRA into the cell selection process.

Further, the UE may measure the radio signals received from the candidate cells, and calculate the cell quality values. (S1104) Then the UE may select the target cell based on the cell quality values. (S1105) If the current cell selection process is included in the RRC connection reestablishment procedure, the UE may select the target cell among the candidate cells based on the condition. In this case, the selected target cell is the cell using the E-UTRA. However, if the current cell selection process is not included in the RRC connection reestablishment procedure, the selected target cell may be the cell using the E-UTRA or the cell using other RAT.

If the UE is not capable of selecting the cell until the cell selection timer is expired (S1106), the UE may release the RRC connection and being leaved from the RRC_CONNECTED state to the RRC_IDLE state. (S1108) Further, if the UE selects the cell using the E-UTRA in S1105, the UE may transmit the RRC connection reestablishment request message to the selected cell.

Figure 12:
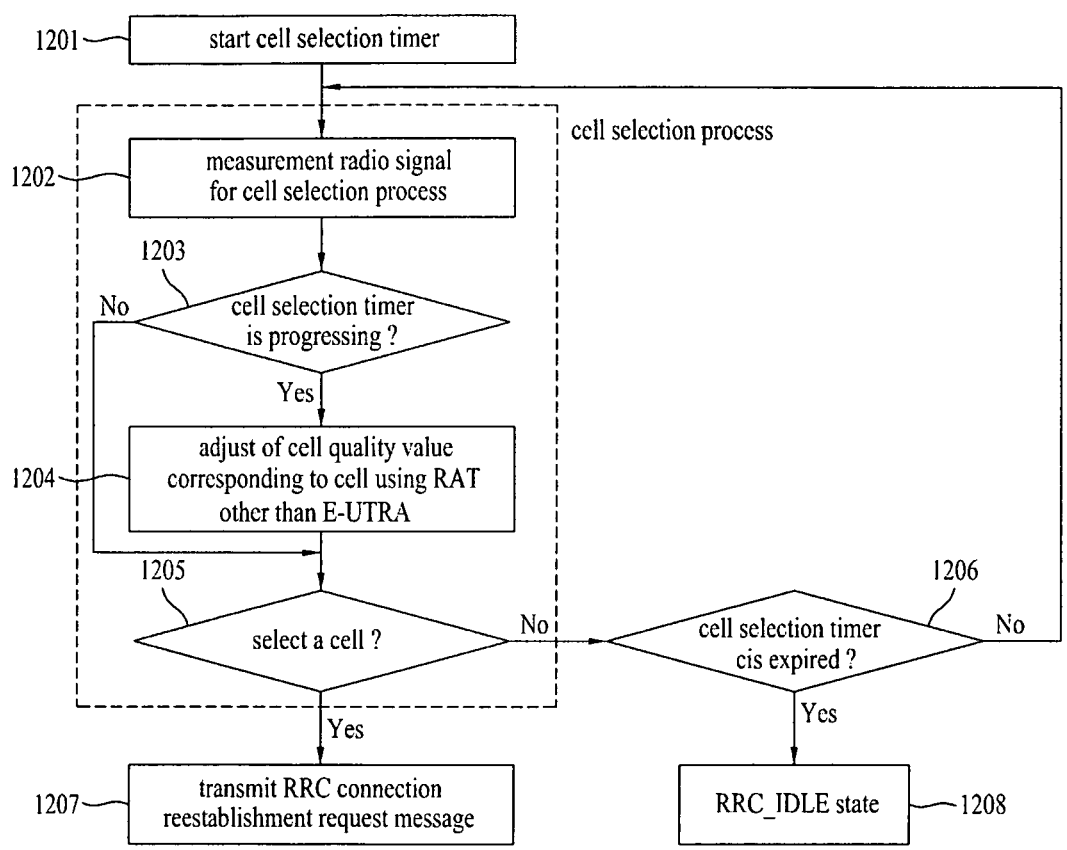
FIG. 12 is shown the cell selection process of the RRC connection reestablishment procedure according to other embodiment of the present invention.

FIG. 12 is shown the cell selection process of the RRC connection reestablishment procedure according to other embodiment of the present invention. Especially, in FIG. 12, it is disclosed the cell selection process using the method for disregarding the cell quality values corresponding to the cells using other RAT or the method for setting those cell quality values as the considerable low values forcibly, in order to preclude the cells using the RAT other than the E-UTRA from the candidate cells.

As shown in FIG. 12, when the RRC connection reestablishment procedure starts, an operation of the cell selection timer may begin firstly. (S1201) In this case, the UE maintains the RRC_CONNECTED state. Next, the UE may measure the radio signals received from the candidate cells, and calculate the cell quality values. (S1202)

Further, the UE may check whether the current cell selection process is included in the RRC connection reestablishment procedure or not. That is, the UE may check whether the cell selection timer is operating or not. (S1203)

If the current cell selection process is not included in the RRC connection reestablishment procedure (that is, the cell selection timer is not operating), the UE may perform the cell selection process using the measured radio signals as it is. (S1205)

On the other hand, if the current cell selection process is included in the RRC connection reestablishment procedure (that is, the cell selection timer is operating), the UE may form a candidate cell quality values through disregarding the cell quality values corresponding to the cells using other RAT or setting the cell quality values as the considerable low values forcibly. (S1204) By doing so, the UE may let the cell using other RAT being configured not to fulfill cell selection criterion.

Further, the UE may select the target cell based on the cell quality values calculated in S1202 or the candidate cell quality values. If the current cell selection process is included in the RRC connection reestablishment procedure, the UE may perform the cell selection process based on the candidate cell quality values. In this case, the target cell must be the cell using the E-UTRA. However, if the current cell selection process is not included in the RRC connection reestablishment procedure, the target cell may be the cell using the E-UTRA or the cell using other RAT.

If the UE is not capable of selecting the cell until the cell selection timer is expired (S1206), the UE may release the RRC connection and being leaved from the RRC_CONNECTED state to the RRC_IDLE state. (S1208) Further, if the UE selects the cell using the E-UTRA in S1205, the UE may transmit the RRC connection reestablishment request message to the selected cell.

<The Method for Transmitting the RRC Connection Reestablishment Request Message Only if the Selected Cell is the Suitable Cell>

Figure 13:
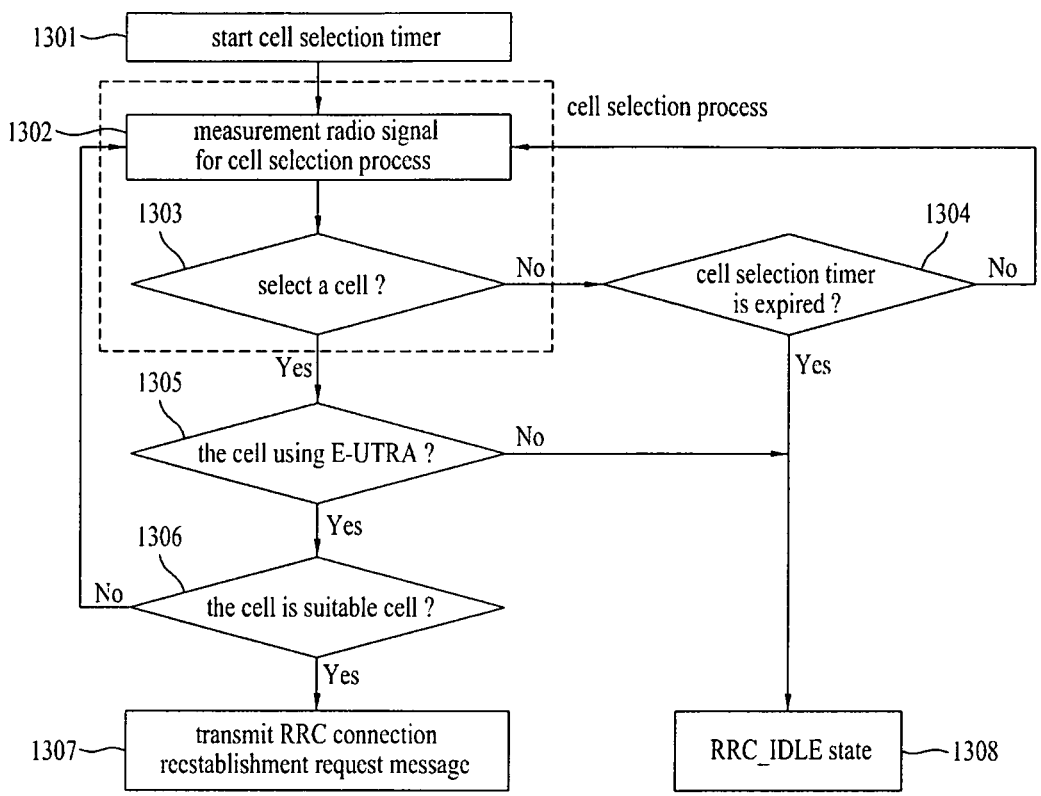
FIG. 13 is shown parts of the RRC connection reestablishment procedure according to one embodiment of the present invention.

FIG. 13 is shown parts of the RRC connection reestablishment procedure according to one embodiment of the present invention. Especially, in FIG. 13, it is disclosed the method for transmitting the RRC connection reestablishment request message only if the selected cell is the suitable cell, not combining with the method for precluding the cells using the RAT other than the E-UTRA from the candidate cells, above-mentioned.

As shown in FIG. 13, when the RRC connection reestablishment procedure starts, an operation of the cell selection timer may begin firstly. (S1301) Then, the UE may measure the radio signals received from the candidate cells, and calculate the cell quality values. (S1302) Next, the UE may select the target cell based on the cell quality values. (S1303) In this case, the selected target cell may be the cell using the E-UTRA or the cell using other RAT.

However, if the UE is not capable of selecting the cell until the cell selection timer is expired (S1304), the UE may release the RRC connection and being leaved from the RRC_CONNECTED state to the RRC_IDLE state. (S1308) Further, if the UE selects the cell using the RAT other than the E-UTRA in S1303, the UE may stop the RRC connection reestablishment procedure and release the RRC connection. That is, the UE may be leaved from the RRC_CONNECTED state to the RRC_IDLE state.

If the UE selects the cell using the E-UTRA in S1303, the UE may check the type of the selected cell (S1306), before transmitting the RRC connection reestablishment request message. The UE can read the SI about the selected cell and utilize the information stored in the UE, in order to check the type of the selected cell. If the selected cell is the suitable cell, the UE may transmit the RRC connection reestablishment request message to the selected cell (S1307).

On the other hand, if the selected cell is the acceptable cell, the UE may perform again the steps S1302~S1306 until the cell selection timer is expired, instead of transmitting the RRC connection reestablishment request message.

<The Enhanced RRC Connection Reestablishment Procedure>

Figure 14:
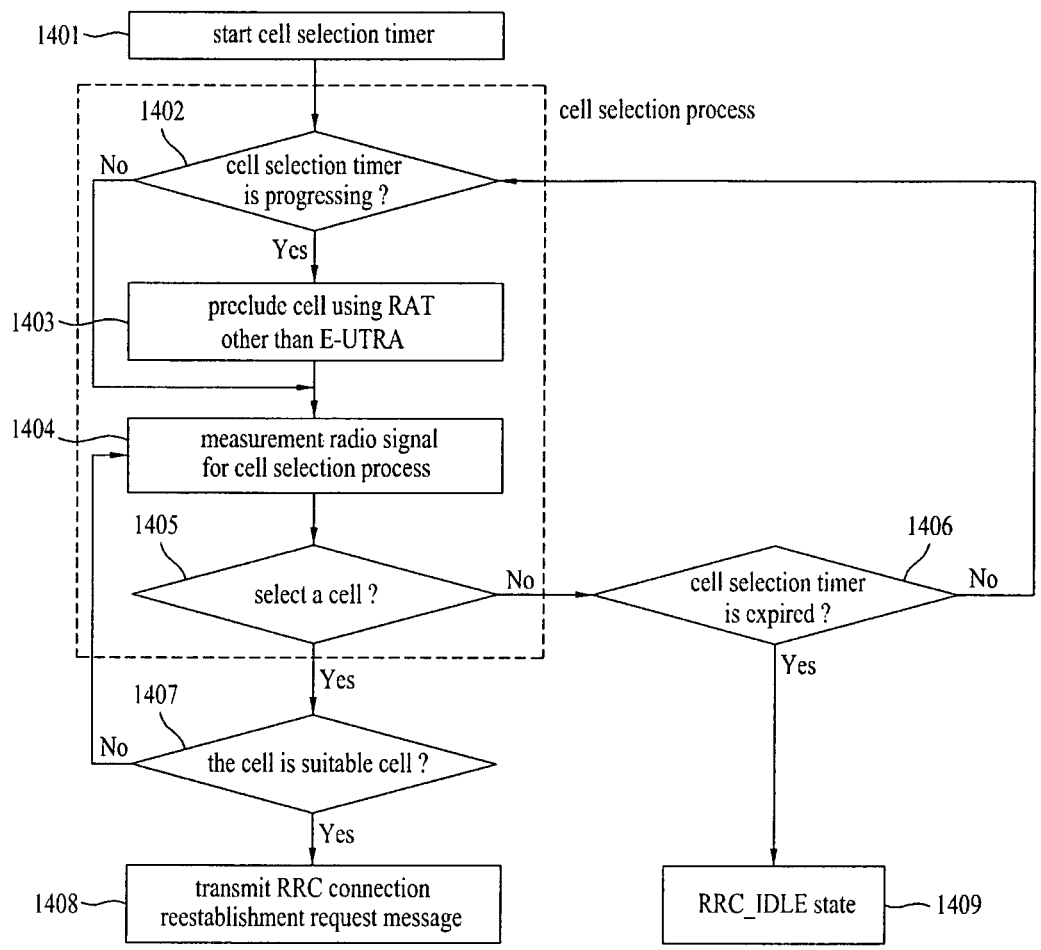
FIG. 14 is shown the enhanced RRC connection reestablishment procedure according to one embodiment of the present invention.

FIG. 14 is shown the enhanced RRC connection reestablishment procedure according to one embodiment of the present invention. Especially, in FIG. 14, the cell selection process using the method for turning off the power of the receivers for the RAT other than the E-UTRA is exampled for precluding the cells using the RAT other than the E-UTRA from the candidate cells. However, it is also possible to using the cell selection process using the method for disregarding the cell quality values corresponding to the cells using other RAT or the method for setting those cell quality values as the considerable low values forcibly.

Further, steps S1401~S1406 is similar to the steps S1101~S1106 in FIG. 11, and then detailed descriptions about the steps S1401~S1406 may be omitted.

As shown in FIG. 14, if the UE check that the cell selection timer is operating (S1402), the UE may preclude the cells using the RAT other than the E-UTRA from the candidate cells (S1403).

Further, the UE may measure the radio signals received from the candidate cells, and calculate the cell quality values. (S1404) Then the UE may select the target cell based on the cell quality values. (S1405). In this case, the selected target cell is the cell using the E-UTRA. If the UE selects the cell using the E-UTRA, the UE may check the type of the selected cell (S1407), before transmitting the RRC connection reestablishment request message. Therefore if the selected cell using the E-UTRA is the suitable cell, the UE may transmit the RRC connection reestablishment request message to the selected cell using the E-UTRA (S1408).

On the other hand, if the selected cell using the E-UTRA is the acceptable cell, the UE may perform again the steps S1404~S1407 until the cell selection timer is expired, instead of transmitting the RRC connection reestablishment request message.

Figure 15:
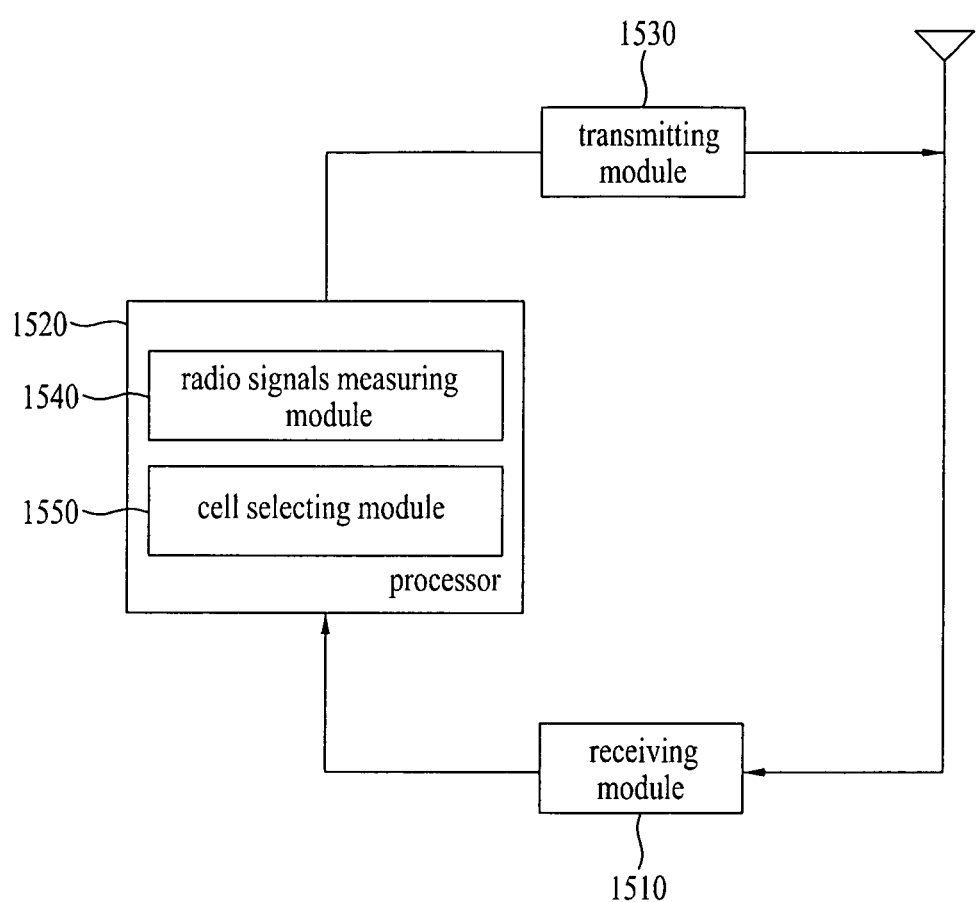
FIG. 15 is shown a block diagram of the user equipment apparatus, according to one embodiment of the present invention.

FIG. 15 is shown a block diagram of the user equipment apparatus, according to one embodiment of the present invention.

As shown in FIG. 15, the user equipment apparatus of the present invention may include a receiving module (1510), a processor (1520), and a transmitting module (1530). Further, the processor (1520) may include a radio signals measuring module (1540) and a cell selecting module (1550).

The receiving module (1510) may receive information for the cell selection or the cell reselection process from the cell, as well as general data. Especially, the receiving module (1510) may receive the RRC connection reestablishment message and the RRC connection reestablishment reject message from the cell. Further, the receiving module (1510) may receive a reference signal or a pilot signal in order to calculate the cell quality values used in the cell selection or the cell reselection process.

The processor (1520) may control general operations of the user equipment apparatus, especially may generate control signals for transmitting in the cell selection or the cell reselection process (ex. the RRC connection reestablishment request message and the RRC connection reestablishment complete message).

Further, the radio signals measuring module (1540) included in the processor (1520) may measure the signal property for the cell selection or the cell reselection process in order to calculate the cell quality values. Herein, the signal property is the characteristic of a physical signal associated with the intensity of the reference signal or the pilot signal, or a signal-to-noise interference ratio, and so on.

The cell selecting module (1550) included in the processor (1520) may retrieve the candidate cells for the cell selection or the cell reselection process, based on the cell quality values. Especially, the cell selecting module (1550) may check whether the current cell selection process is included in the RRC connection reestablishment procedure or not. Preferably, the cell selecting module (1550) may check whether the cell selection timer is operating or not.

Preferably, the cell selecting module (1550) may preclude the cells using the RAT other than the E-UTRA from the candidate cells, if the current cell selection process is included in the RRC connection reestablishment procedure.

In order to implementing the above mentioned feature of the present invention, the cell selecting module (1550) may turn off the receiver for the RAT other than the E-UTRA.

Alternatively, the cell selecting module (1550) may form a candidate cell quality values through disregarding the cell quality values corresponding to the cells using other RAT or setting the cell quality values as the considerable low values forcibly. In this case, the cell selecting module (1550) may select the target cell based on the candidate cell quality values.

In the cell selection process during the RRC connection reestablishment procedure, the processor (1520) may consider only the suitable cells among the selected cells using the E-UTRA as the target cell for the RRC connection reestablishment procedure. That is, if the selected cell using the E-UTRA is the acceptable cell, the processor (1520) may control the cell selecting module (1550) to retrieve the suitable cell again until the cell selection timer is expired, instead of transmitting the RRC connection reestablishment request message.

The transmitting module (1530) may transmit the RRC connection reestablishment request message and the RRC connection reestablishment complete message to the cell, as well as the uplink data or the control data to the cell. Especially, the transmitting module (1530) may transmit the RRC connection reestablishment request message to the cell only if the selected cell using the E-UTRA is the suitable cell.

The embodiments of the present invention have the following effects. First, it is possible to increase the probability of reestablishing the RRC connection. Second, decreased the service suspension time, the continuity of the RRC connection can be ensured.

The above-described embodiments are combinations of components and features of the present invention in a predetermined form. The components or features are optionally considered unless otherwise stated. The components or features may be implemented without being combined with other components or features. The embodiments of the present invention may be configured by combinations of some of the components and/or features. The order of the operations described in the embodiments of the present invention may be modified. Some of the components or features of any embodiment may be included in another embodiment or may be replaced with the corresponding components or features of another embodiment. It will be apparent to those skilled in the art that claims which are not explicitly associated are combined so as to configure an embodiment or may be included as a new claim by an amendment after application.

In the present specification, the embodiments of the present invention will be described concentrating on the transmission/reception of data between the UE and the base station. A certain operation which is performed by the base station may be performed by an upper node, if necessary. That is, various operations performed by the network including a plurality of network nodes including the base station for communication with the UE may be performed by the base station or other network nodes except the base station. The term "base station" may be replaced with a fixed station, a Node B, an eNode B (eNB), or an access point. In addition, the term "UE" may be replaced with a mobile station (MS) or a mobile subscriber station (MSS).

The embodiments of the present invention may be implemented by various units, for example, hardware, firmware, software or a combination thereof. In particular, the previously described UE, eNB and MME devices include one or more processors configured to execute the corresponding steps shown in FIGS. 11-16. The previously described UE, eNB and MSS devices also include network interface devices and other communication modules. The previously described UE, eNB and MSS devices may also include display and input devices or components.

Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, micro controllers or microprocessors.

Various embodiments of the present invention may be implemented in the form of software modules, procedures or functions for performing the above-described functions or operations. A software code may be stored in a memory unit and operated by a processor. The memory unit may be located inside or outside the processor so as to exchange data with the processor by various known units.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of reestablishing a RRC (Radio Resource Control) connection by a user equipment (UE) using Multi RAT (Radio Access Technology) in a RRC_CONNECTED state with a cell using an E-UTRA (Evolved Universal Terrestrial Radio Access), the method comprising:
   generating cell quality information based on signal measurements from a plurality of candidate cells;
   determining that a current cell selection process is included in a RRC connection reestablishment procedure by establishing that a cell selection timer procedure is running;
   based on the determination that the current cell selection process is included in the RRC connection reestablishment procedure, generating a candidate cell set by precluding at least one candidate cell from the plurality of candidate cells, wherein the at least one candidate cell uses a RAT other than the E-UTRA and wherein precluding the at least one candidate cell involves forcibly adjusting a cell quality information value of the at least one candidate cell to a lower value;
   selecting a target cell from the candidate cell set based on cell quality information corresponding to each cell in the candidate cell set, and
   determining whether the target cell is a suitable cell or an acceptable cell by obtaining system information of the target cell;
   based on a determination that the target cell is a suitable cell, transmitting a RRC connection reestablishment request message to the target cell, and
   based on a determination that the target cell is an acceptable cell, selecting another target cell among the candidate cell set and repeating target cell selection until a suitable cell is selected or the cell selection timer procedure expires.

2. The method of claim 1, further comprising:
   starting the cell selection timer procedure before generating the candidate cell set; and
   setting the UE in a RRC_IDLE state with the cell using the E-UTRA, when the target cell is not selected before the cell selection timer procedure expires.

3. The method of claim 1, further comprising:
   receiving a RRC connection reestablishment message from the target cell after the transmission of the RRC connection reestablishment request message; and
   transmitting a RRC connection reestablishment complete message to the target cell.

4. A user equipment (UE) using Multi RAT (Radio Access Technology) in a RRC_CONNECTED state with a cell using an E-UTRA (Evolved Universal Terrestrial Radio Access), the UE comprising:
   a transmitting module;
   a receiving module configured to receive signals and based on these signals, generate cell quality information from a plurality of candidate cells;
   a processor configured to:
      determine that a current cell selection process is included in a RRC (Radio Resource Control) connection reestablishment procedure by establishing that a cell selection timer procedure is running,
      generate, based on the determination that the current cell selection process is included in RRC connection reestablishment procedure, a candidate cell set by precluding at least one candidate cell from the plurality of candidate cells, wherein the at least one candidate cell uses a RAT other than the E-UTRA and wherein precluding the at least one candidate cell involves forcibly adjusting a cell quality information value of the at least one candidate cell to a lower value, select a target cell from the candidate cell set based on cell quality information corresponding to each cell in the candidate cell set, and determine whether the target cell is a suitable cell or an acceptable cell by obtaining system information of the target cell, control the transmitting module to transmit a RRC connection reestablishment request message to the target cell based on a determination that the target cell is a suitable cell, and select another target cell among the candidate cell set and repeat target cell selection until a suitable cell is selected or the cell selection timer procedure expires, based on a determination that the target cell is an acceptable cell.

* * * * *